US009081902B2

(12) United States Patent
Cavalaris et al.

(10) Patent No.: US 9,081,902 B2
(45) Date of Patent: Jul. 14, 2015

(54) GENERALIZED ARCHITECTURE TO SUPPORT REPRESENTATION OF MULTI-TRANSPORT DEVICES

(75) Inventors: James G. Cavalaris, Kirkland, WA (US); Narayanan Ganapathy, Redmond, WA (US); Doron J. Holan, Seattle, WA (US); Randall E. Aull, Kenmore, WA (US); Paresh J. Maisuria, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 1846 days.

(21) Appl. No.: 12/143,194

(22) Filed: Jun. 20, 2008

(65) Prior Publication Data

US 2009/0319660 A1 Dec. 24, 2009

(51) Int. Cl.
| G06F 15/16 | (2006.01) |
| G06F 13/38 | (2006.01) |
| H04W 76/02 | (2009.01) |
| H04L 29/08 | (2006.01) |
| H04L 29/06 | (2006.01) |

(52) U.S. Cl.
CPC .............. *G06F 13/385* (2013.01); *H04L 67/14* (2013.01); *H04L 69/24* (2013.01); *H04W 76/021* (2013.01)

(58) Field of Classification Search
CPC ..... H04L 69/24; H04L 67/14; H04W 76/021; H04W 76/025
USPC ......... 709/202, 217, 218, 223, 227, 228, 250, 709/238, 220; 715/733–737; 719/321, 327
See application file for complete search history.

(56) References Cited

U.S. PATENT DOCUMENTS

| 6,266,701 | B1 | 7/2001 | Sridhar | |
| 6,421,069 | B1 * | 7/2002 | Ludtke et al. | 715/762 |
| 7,013,350 | B2 | 3/2006 | Enns | |
| 7,039,709 | B1 * | 5/2006 | Beadle et al. | 709/227 |
| 7,277,719 | B2 | 10/2007 | Klassen | |
| 7,283,546 | B2 | 10/2007 | Gallant | |
| 7,966,622 | B1 * | 6/2011 | Purser et al. | 719/321 |
| 2005/0203673 | A1 | 9/2005 | El-Hajj | |

(Continued)

OTHER PUBLICATIONS

Barnes et al. Transport Discovery in Wireless Multi-Transport Environments IEEE 2003, 6 pages, pp. 1328-1333.*

(Continued)

*Primary Examiner* — David Lazaro
(74) *Attorney, Agent, or Firm* — Sade Fashokun; Timothy Churna; Micky Minhas

(57) ABSTRACT

A computer system that accesses multi-transport devices and associates device instances of the multi-transport device with each other. Devices provide the same device identifier such as a device unique identifier regardless of the transport over which the device is accessed. A visual representation for the multi-transport device may be provided to a user using the device identifier. Also, a single functional representation for the multi-transport device may be provided based on an identifier provided by each function of the device. The functional representation may be independent of the addition and removal of transports and allows abstracting device access via multiple transports from a user and an application. Transports may be selected at an application and/or a system level. Operating characteristics of available transports may be used to select a desired transport, based on transport requirements specified by the application, the user or the system.

18 Claims, 9 Drawing Sheets

(56) References Cited

U.S. PATENT DOCUMENTS

2005/0246455 A1* 11/2005 Bhesania et al. ................ 710/10
2006/0080517 A1 4/2006 Brown

OTHER PUBLICATIONS

Barnes, S. et al., Transport Discovery in Wireless Multi-Transport Environments, IEEE, 2003, p. 1328-1333, http://ieeexplore.ieee.org/xpl/freeabs_all.jsp?arnumber=1200566.

Duan, Q., et al., Axiomatic Multi-Transport Bargaining: a Quantitative Method for Dynamic Transport Selection in Heterogeneous Multi-Transport Wireless Environments, IEEE, 2006, p. 98-105, http://ieeexplore.ieee.org/Xplore/login.jsp?url=/iel5/11060/34934/01683448.pdf?tp=& isnumber=&arnumber=1683448.

Extended Systems Releases New Infrared Software Development Kit for Handheld Devices, Feb. 12, 2001, http://findarticles.com/p/articles/mi_m0EIN/is_2001_Feb_12/ai_70356275.

Knutson, C. et al., Dynamic Autonomous Transport Selection in Heterogeneous Wireless Environments, IEEE, 2004, p. 689-694, http://ieeexplore.ieee.org/xpl/freeabs_all.jsp?tp=&arnumber=1311269&isnumber=29115.

Krueger, M. et al., NAA Naming Format for iSCSI Node Names, Feb. 2003, http://www.ietf.org/proceedings/03mar/I-D/draft-ietf-ips-iscsi-name-ext-00.txt.

Multitransport Device Installation and PnP X Out-of-Band Association, Microsoft Corp., Nov. 14, 2007, download.microsoft.com/download/9/c/5/9c5b2167-8017-4bae-9fde-d599bac8184a /PnPX-OOBassoc.docx.

Wang, L., A Performance Evaluation of Dynamic Transport Switching for Multi-Transport Devices, Dec. 2006, http://contentdm.lib.byu.edu/cgi-bin/showfile.exe?CISOROOT=/ ETD &CISOPTR=844& filename=etd1603.pdf.

* cited by examiner

GENERALIZED ARCHITECTURE TO SUPPORT REPRESENTATION OF MULTI-TRANSPORT DEVICES

BACKGROUND

To provide versatility, devices may connect to computers over one or more transports. Examples of such multi-transport devices include cell phones, personal digital assistants (PDA's), and handheld personal computers. Such devices may be connected to the computers over various wired or wireless transports. A transport may be defined as technology used to transfer data from one device or to another. Examples of transports include a USB, an IEEE 1394 and a Bluetooth connection.

When a multi-transport device is connected to a computer system, the system recognizes individual device instances on different transports. Thus, from the perspective of the computer, each of the transports over which the computer accesses a multi-transport device presents a separate device connected to the computer. The computer may interface to each such device through a driver associated with the device. The capabilities to interact with the device through the device driver may be exposed to a user of the computer or to applications executed by the computer, through one or more interfaces.

SUMMARY

An experience for a user of a computer system may be improved by enabling the computer to recognize that a multi-transport device is communicating with the computer and to identify device instances on different transports. With this capability, for example, a computer may present to a user information about the multi-transport device as a whole rather than information about individual device instances of the multi-transport device. Information about the multi-transport device may more closely match the perception of the user, who may see a single device attached to the computer, even though that device may be accessed via multiple transports.

A multi-transport device may perform multiple functions each of which may exist over one or more of different transports used to access the device. Therefore, a device instance on a transport for such multi-transport multi-function device may represent a function of the device.

A single functional representation for a multi-transport device may be provided that ties together multiple device instances on different transports used to access the device. The device instances may be identified using a common identity such as an identifier. The identifier may comprise, for example, a device identifier and/or a function identifier. The functional representation allows interacting with the multi-transport device which includes managing the device instances on different transports by selecting appropriate transports, seamlessly switching transports, and responding to addition and removal of transports.

The transports may be explicitly selected based on user, application or computer system preferences. In addition, a user may provide requirements for a transport and the system may select a suitable transport on behalf of the user, based on the requirements. Similarly, applications may be provided continuous service by being abstracted from the explicit selection of transports. The service may be provided to an application even when one of the underlying transports fails. An application may specify desired transport requirements which are then used by the system to select a suitable transport. The transports may be selected based on their operating characteristics.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
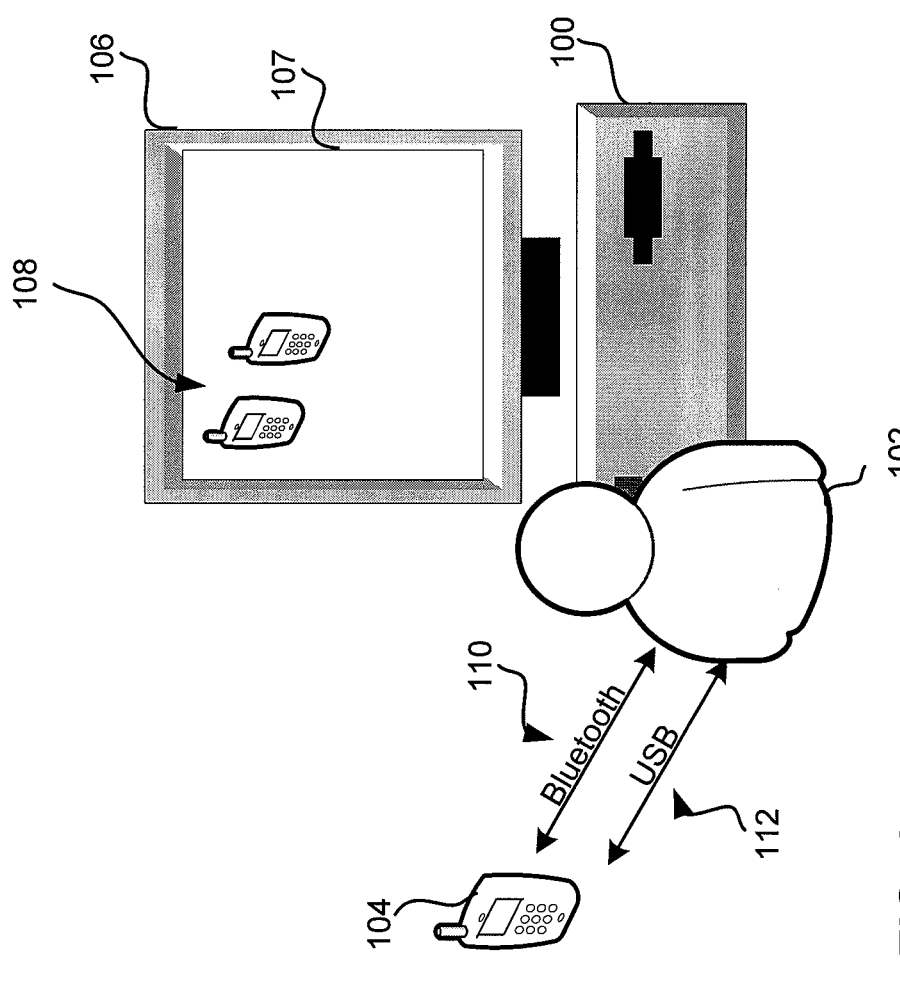
FIG. 1 is a sketch of an example of a prior-art system comprising a multi-transport device.

The inventors have appreciated that the experience for a user of a computer to which a multi-transport device is connected may be improved by representing an actual physical multi-transport device as a single entity. Device instances on multiple transports may thus be linked together. The representation may be independent of the available transports and may allow a unified access to functionalities provided by the multiple transports. The representation may also be used to present the multi-transport device to the user, for example, as an icon on a user interface of the computer. Such a representation of the multi-transport device may match a user perception of the device.

The inventors have further appreciated that device instances of a multi-transport device may be associated with each other using a common identity. The identity may comprise a device identifier. Thus, each transport instance of the multi-transport device may report the same device identifier. The device identifier may be a globally unique identifier.

The inventors have also appreciated that in order to seamlessly manage the multi-transport device and provide the representation for the device, an entity may be created that represents the device. The entity may be created for each function of the device if the device performs multiple functions. According to some embodiments, a composite device object is created when the device first connects to the computer. A component such as a driver for the composite device object is then used to interact with the device or each function of the device by, for example, seamlessly utilizing and managing transports used to access the function of the device. Utilizing the composite device object and a driver associated with the object allows identifying properties of the transports, detecting changes in a number of transports and their properties, selecting the transports based on their properties, and managing addition and removal of transports. The composite device object may not be enumerated by any single bus driver.

Some embodiments of the invention provide a method of selecting one or more transports to access the device. The transports may be selected by a user or an application and may be selected either explicitly or implicitly. The explicit selection may be based on an input identifying a specific transport to use. Alternatively, the user or the application may specify desired transport requirements and the system may then evaluate properties of the available transports and select a transport whose operating characteristics match the best the specified transport requirements. Further, the system (e.g., a driver for the composite device object, an operating system or other suitable component) may make the decisions regarding transport selection. To realize such transport selection, a policy may be defined in the system. For example, a default policy may be defined to perform transport selection based on whether the device is running low on battery power. This selection may be possible because the composite device object for the multi-transport device keeps track of the operating characteristics of the available transports. Further, if the operating characteristics change, they may be re-evaluated and a more suitable transport may be selected for communications with the device.

FIG. 1 shows an example of a prior art system in which each transport over which a multi-transport physical device can be accessed is presented to a user of the system as an instance of the multi-transport device, referred to as a "device instance" of the device. The multi-transport device may also be a multi-function device having multiple functions each of which can be accessed over one or more transports. For a multi-transport multi-function device, a device instance may be an instance representing a function of the device over a transport. An operating system of a computer communicating with the device perceives each transport over which the device can be accessed as a separate device instance of the multi-transport physical device. In this example, a user utilizes a computer system 100 to interact with the multi-transport device. Thus, a user 102 may, for example, view and manage a multi-transport device 104. In this example, device 104 is a cell phone that can be accessed via a Bluetooth link 110 and/or a USB connection 112. Both transports may be simultaneously employed to access the device.

It should be appreciated that any suitable device that can be accessed via more than one transport can be accessed as a multi-transport device. For example, device 104 may be a PDA, a handheld personal computer, a mouse, a keyboard, a printer or any other multi-transport device. Device 104 may be a multi-function device such as, for example, a "smart" phone that performs functions of a phone, a video camera and a digital photo camera. Also, the transports shown in FIG. 1 are exemplary only.

Transports may be any suitable communications mechanisms and may utilize any transport mechanism, whether wired (e.g., USB) or wireless (e.g., Bluetooth, Wi-Fi, and infrared) technologies. Each transport may be characterized by distinct characteristics. Further, the transports may change dynamically such that one or more transports may disappear and new transports may become available to access the device.

Computer 100 may include a display 106. The display may comprise, for example, a graphical user interface 107 through which information on a device may be presented and through which a device may be managed. In this example, multi-transport device 104 may be presented on the user interface 107 as two icons 108, one for each transport instance of the device. It should be appreciated that the transports of device 104 are shown as the icons resembling the device for representation purposes only and, in embodiments of the invention, any suitable formats may be used to display information relating to the devices or their instances corresponding to different transports. Further, each icon may be manipulated (e.g., clicked on, moved, deleted, etc.) and information associated with the icon may be presented on display 106.

Computer 100 may utilize Plug-and-Play (PnP), which is a technology that allows linking a device such as device 104 with the computer without having to manually configure settings of the computer. The traditional PnP architecture provides a model for representing devices connected to the computer using a device tree hierarchy. In such a hierarchy, a presence of any "child" device is determined by a "parent" device. A device that connects to a computer system is discovered by a bus driver that enumerates the device. The bus driver thus becomes a "parent" of the device. However, computer 100 may utilize different bus technologies each of which can provide an independent input/output (I/O) path to device 104. Therefore, different transport instances of the multi-transport device may be discovered by different buses and may thus have different "parents" on the device tree. Thus, a single multi-transport device may be represented on the device tree multiple times, with a "node" in the device tree associated with a device instance on a transport over which the device can be accessed. This imposes limitations on representing multi-transport devices to users and applications because each instance of the device associated with a transport is represented as a separate device.

Each instance of the multi-transport device may be installed separately and may have a separate representation, as shown in FIG. 1. While icons 108 are shown as identical icons, they may have different visual representations for the USB and Bluetooth connections. Each transport instance of the device appears to user 102 as a separate physical device that can be managed and/or utilized independently of the others. Thus, the user may perceive icons 108 as two physical devices connected to computer 100. This may create difficulties for a user in determining which instance of the device to utilize while interacting with the device. User 102 may not be able to distinguish which icons represent physical devices each accessed via a single transport and which icons represent transport instances of a multi-transport device, which impairs ability of the user to manage the multi-transport device. Also, when one of the transports becomes unavailable (e.g., a USB cable connecting a cell phone to a computer is unplugged), an icon representing this transport to a user disappears from the display, which further complicates identification of the device as capable of being accessed via multiple transports.

Similarly, applications may discover each transport instance independently of other transport instances and may not be able to efficiently utilize capabilities of a multi-transport device. In particular, it may be complicated to determine which transport, or instance of the device, to use. Moreover, a transport with certain characteristics may be more desirable for an application to communicate with the device. Thus, without a mechanism to link the transport instances together, it may not be possible to determine that the instances in fact represent transports of a single multi-transport device rather than separate physical devices. Moreover, switching to a different transport when this transport provides a more desired functionality or when a previously used transport becomes unavailable may not be possible.

Embodiments of the invention provide a method that helps overcome the limitations associated with inability to identify that a device is a multi-transport device that can be accessed by a computer system via a plurality of transports or that separate device instances on a transport belong to the same device or a function of the device when the device has multiple functions. Accordingly, in some embodiments, a device identifier may be obtained from the device and each device instance of the device may be identified by the same identifier. A representation for the device may be created using the device identifier. Also, an entity providing a functional representation of the device may be created that ties together the device instances of each function of the multi-transport device accessible over one or more transports. The functional representation which may be referred to as a composite device object allows aggregating functionalities provided by the transports. Thus, the device may be accessed using the functional representation of the device.

Figure 2A:
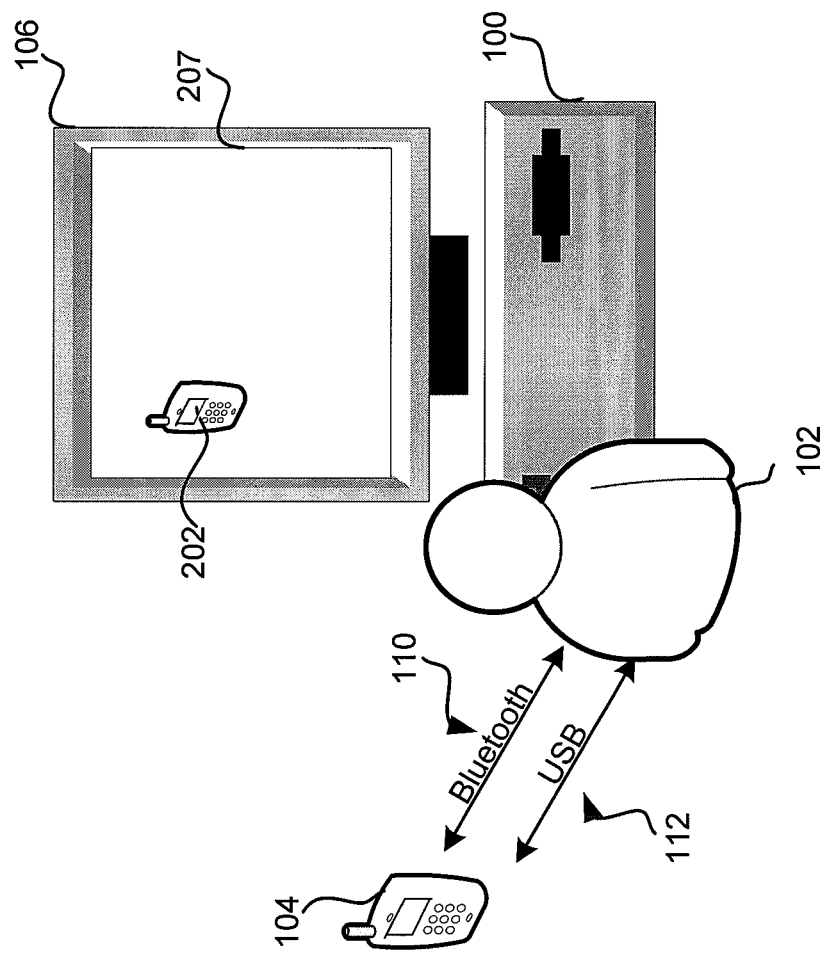
FIG. 2A is a sketch of an example of a system in which a multi-transport device is presented to a user of the system according to some embodiments of the invention.

FIG. 2A shows an example of a system in which a multi-transport device is presented to a user of the system. It should be appreciated that a single device is shown for representation purposes only as more than one multi-transport device may be presented to the user. The systems shown in FIG. 1 and FIG. 2A may be implemented using similar technology. FIG. 2A may include components similar to those included in the system shown in FIG. 1. However, in this example, the system may provide a representation for the multi-transport device independent of the transports used to interact with the device. Therefore, the system shown in FIG. 2A may include components to accommodate interaction with the multi-transport device according to some embodiments of the invention. The representation allows interacting with the device in any suitable manner. For example, computer 100 may generate a visual representation of the device. As a result, display 106 comprises user interface 207 that presents a single icon 202 for multi-transport device 104. Device 102 can be accessed via the Bluetooth link 110 and/or the USB connection 112. The user experience thus may be improved by enabling the user to view a multi-transport device as a single entity on a display. Such representation matches a user perception of a single physical device. In FIG. 2A, icon 202 bears a resemblance to the respective physical device 104 which, in this example, is a cell phone. However, it should be appreciated that any suitable visual representation for the multi-transport device that facilitates user experience may be substituted.

The icon representing a multi-transport device (e.g., icon 202) may be selected and information associated with the multi-transport device may be presented in any suitable way. For example, upon clicking on an icon corresponding to a multi-transport device, available transports may be shown, either as icons corresponding to the transports (e.g., as shown in FIG. 1) or in other suitable visual and/or textual formats. In addition, other visual and textual information may be presented for the multi-transport device and the associated transports. For example, properties of available transports may be presented.

The system shown in FIG. 2A differs from that shown in FIG. 1 in respect that each device instance of device 104 may provide a device identifier which allows computer 100 to determine that device 102 is a single physical multi-transport device interacting with the computer via the plurality of transports, such as the Bluetooth link 110 and the USB connection 112, rather than two physical devices, one available over the Bluetooth link and another via the USB connection. The device identifier may be a unique device identifier for a multi-transport device having a single function (e.g., a cell phone) or multiple functions (e.g., a cell phone having functions of a phone and of a photo camera). The device identifier is globally unique when no other device is assumed to use the same identifier for this purpose. The device identifier may be provided by a manufacturer of the device and stored in a non-volatile memory of the device. In some embodiments, the device identifier may be a string. Any other suitable format for the device identifier may be substituted.

Further, to provide a unified access to device instances of the device, an entity may be created for the device that represents device 104 or each function of the device if device 104 is a multi-function device. To create the entity, an identifier such a function identifier, which is different from the device identifier used to create a representation for a user, may be provided by device 104 or each of its functions. This is described in more detail below.

Identifying transports of a multi-transport device and providing a representation for the multi-transport device independent of the plurality of transports may overcome limitations of the system described in connection with FIG. 1. For example, the user may be able to manage the multi-function device as a whole and select desired transports.

Further, a functional representation created to represent each function of the device allows selecting a transport to access the device, seamlessly managing removal and addition of transports, notifying a user or an application of current characteristics of the available transports may be possible. In some scenarios, transports used to interact with the device and its functions may be added and removed dynamically. Embodiments of the invention provide a method in which each device instance of a multi-transport device reports (e.g., using an identifier) to the computer system communicating with the device its identity. Thus, the representation for each function of the multi-transport device may be provided regardless of a number of transports available to access the function. When a multi-transport device connects to a computer via a single transport, the representation for the device is created that allows interacting with the device. If the device becomes accessible via additional transports, the representation is maintained independently of the number of transports. Similarly, the representation is maintained when some transports go away, as discussed in more detail below.

Figure 2B:
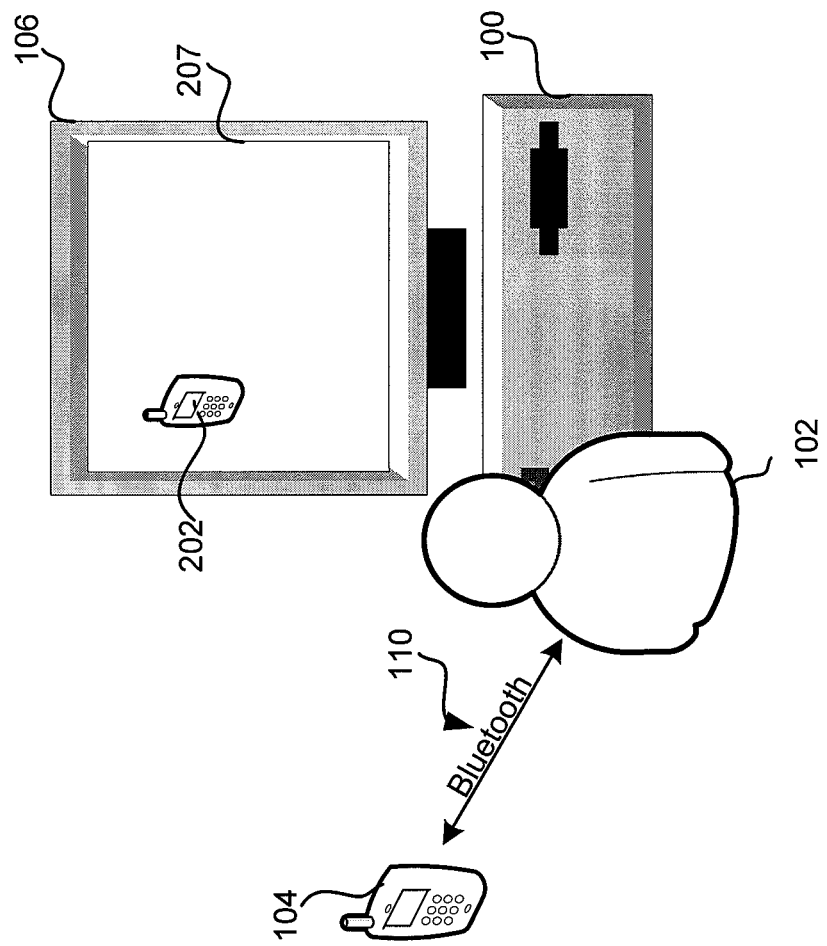
FIG. 2B is a sketch of another example of a system in which a multi-transport device is presented to a user of the system according to some embodiments of the invention.

FIG. 2B shows another example of a system in which a multi-transport device is presented to a user of the system. This system is essentially identical to the system shown in FIG. 2A and includes similar components. As discussed above, a device identifier (e.g., a globally unique device identifier) may be used by each device instance to report its identity to the system. However, FIG. 2B illustrates a scenario when only one transport is available to access device 104. In this example, device 104 is accessible via Bluetooth link 110. As an example, a USB transport may have been disconnected. As an alternative, the USB connection may not have been established. This example demonstrates that the same representation (e.g., icon 202) for the multi-transport device (e.g., device 104) is maintained independently of changes in transports available to access the device. Therefore, the same icon 202 is presented to user 102 on user interface 107 when either both transports 110 and 112 are available or when device 104 is accessible via transport 110 only. It should be appreciated that any suitable number of transports can be available to access a multi-transport device. The representation for the device may be removed, possibly after some time interval, from the user interface when no transports are available to access the device, as discussed in more detail below.

Figure 3:
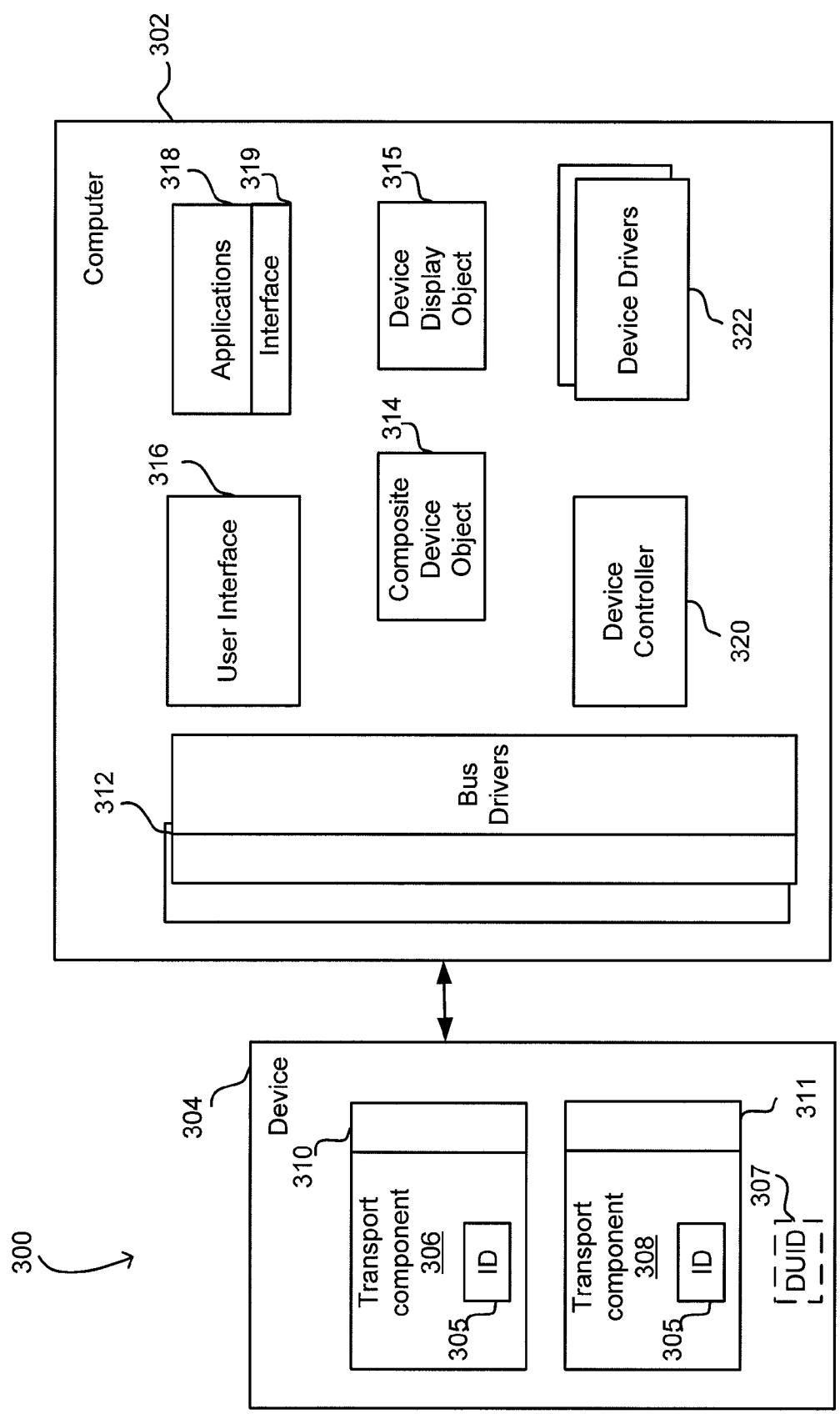
FIG. 3 is a block diagram of a system in which some embodiments of the invention may be implemented.

FIG. 3 shows a system 300 in which some embodiments of the invention may be implemented. System 300 comprises a computer 302 and a multi-transport device 304 that may be accessed via multiple transports, which may communicate via one or more wireless or wired transports. Examples of the transports may be, for example, a USB connection, a Bluetooth link and others. Device 304 is shown by way of example only as a single-function device. However, it should be appreciated that device 304 may be a multi-function, multi-transport device having multiple functions, with each of the functions supporting connections over one or more of the multiple transports. Device 304 may include any suitable components such as memory storing an operating system and other software, at least one processor executing the operating system and the other software, display and other components providing functionality of the device. For example, if the device is a cell phone, it may also include at least a speaker and a keypad.

Device 304 may comprise transport components 306 and 308, each associated with a respective transport. For example, transport component 306 may be associated with the Bluetooth connection while transport components 308 may be associated with the USB connection. The transport components may be implemented using known technology providing communications between devices via various wireless and wired connections. Thus, each transport component may include respective drivers. Further, interfaces may be provided to enable a connection between the device and the computer. For example, a USB interface for the USB connection may be included to communicate over a USB cable with the computer. As another example, the transport component associated with the Bluetooth connection may comprise one or more Bluetooth-capable wireless transceivers to communicate over a Bluetooth link with the computer. In addition, the transport components may include components accommodating functionality provided by some embodiments of the invention. Thus, each transport component may provide a device, function or any other suitable identifier to report an identity of a device instance on this transport to the computer. It should be appreciated that embodiments of the invention are not limited to a specific number of transports or to any particular type(s) of transports.

As discussed above, device instances for transports used to access a multi-transport device may be identified based on a common identity of the transports. For example, identifiers may be employed for this purpose. Thus, when two device instances, each on a different transport, provide the same identifier, the computer may determine that one physical multi-transport device is connected to it via the two transports.

Device instances of a function of a multi-transport device over different transports may provide the same identifier that may be referred to as a function identifier. This identifier may be used to create a composite device object for each function of the device, as discussed in more detail below. Also, all functions of the device may report the same identifier across all of the transports, with this identifier being referred to as a device unique identifier (DUID). DUID may be used to create a representation of the device such as, for example, icon 202 shown in FIGS. 2A and 2B. Function identifier which may be different from the device unique identifier.

In the example illustrated in FIG. 3, device instances on transports used to access the multi-transport device 304 may be identified by the same identifier. As discussed above, device 304 is shown by way of example only as a single-function device. Thus, transport components 306 and 308 may each provide the same identifier shown as ID 305. The system (e.g., a PnP manager or other suitable component) may load a transport device driver for each of transport device objects created in the system. Transport components 306 and 308 may each provide ID 305 to the respective transport device drivers. It should also be appreciated that transport instances may be associated together in any other suitable manner as embodiments of the invention are not limited in this respect. The common identity of the transports may be provided, for example, by a field in an identifier for the multi-transport device and/or the transports.

Further, transport components 306 and 308 of device 304 may provide DUID 307 which is a unique device identifier used to create a representation of device 304. DUID 307 is shown outside of transport components 306 and 308 to illustrate that this identifier, if available, is provided by each device instance for each function of the device and across all of the transports used to access the device.

The device identifier such as DUID 307 may be provided by a manufacturer of the device. In some scenarios, the identifier may be embedded into a suitable component of device 304 (e.g., one or more hardware or firmware components). The device identifier may also be stored in a non-volatile memory, such as a Flash memory or a microcode memory in device 304. However, the specific mechanism used to store the device identifier for device 304 is not critical to embodiments of the invention and any suitable mechanism may be used. DUID 307 is shown in a dashed line to illustrate that DUID 307 may not be available.

An identifier such as, for example, ID 305 or DUID 307, for each transport may be provided to computer 302 via any suitable component(s). For example, each transport component may have at least one interface which provides the identifiers to computer 302. FIG. 3 shows that transport components 306 and 308 may include interfaces 310 and 311, respectively. In some embodiments, interfaces 310 and 311 may also provide characteristics of available transports to computer 302. The interfaces may be any suitable interfaces that provide device 304 with ability to connect to other external devices such as computer 302 via the respective transports.

When device 304 connects to computer 302 via one or more transports (e.g., a Bluetooth and/or USB connections), the transports may be detected by computer 302 using bus drivers 312. In some embodiments, computer 302 may utilize different bus technologies each of which can provide an independent I/O path to the device. These embodiments may utilize the PnP architecture to communicate with devices connected to computer 302 (e.g., device 304).

Furthermore, some embodiments provide a mechanism that allows multiple transport instances of a multi-transport device to commonly "own" a single entity representing the device. The entity which is a functional representation for device 304 may be referred to as a composite device object that is a programming object maintained in a suitable component such as memory of computer 302. A composite device object 314 is created when a driver for at least one device instance of a multi-transport device is first loaded. A composite device object 314 may then be created and maintained using ID 305. The composite device object 314 may be created for each function of device 304. The composite device object is a logical representation of the device and can be implemented in any suitable way. The composite device object may be, for example, a node in the device tree. However, it is not enumerated by any single bus driver and aggregates a plurality of the functionalities provided by the transports thus allowing managing the device and the associated transports as a whole. Thus, composite device object 314 permits an I/O path to a function of the device and an application or other entity can communicate with the function such that there is no need for the application or the other entity to know a state of different transports.

It should be appreciated that composite device object 314 is shown in FIG. 3 by way of example only, to illustrate that this component allows interacting with the multi-transport device 304 independently of its transport instances. It should also be appreciated that the composite device object described herein as created for a multi-transport device is created for each function of the multi-transport device based on an identifier such as ID 305. Therefore, a composite device object may be created for each function of the device. Thus, more than one composite device objects may be created for the device. A component that enumerates the composite device object (e.g., a PnP manager) allows interacting with the function supporting connections over multiple transports. One or more composite device drivers are loaded for the composite device object. A driver for the composite device object is loaded with an identifier such as a function identifier ID 305 provided by a device instance of device 304. When device 304 becomes accessible over another transport, a driver for this new transport is loaded with the identifier identical to that provided by the transport over which device 304 was first accessed by computer 302. The driver for the new transport provides the identifier to composite device object 314 so that a suitable software component such as a composite device driver recognizes that the new transport is another device instance of device 304 or a function of the device. Thus, computer 302 may comprise one or more device drivers 322 loaded for device 304. Device drivers 322 may include drivers for composite device object 314 and transport device objects discussed in more detail below and any other entities. Further, any other suitable component may be used to discover that a new transport has arrived or an existing transport has disappeared and notify the composite device driver of the transport arrivals and/or departures.

Device controller 320 of computer 392 maintains information on device 304 and controls loading of device drivers 322. In embodiments of the invention employing the PnP architecture, device controller may be, for example, a PnP manager. Bus drivers 312 may report to the PnP manager addition and removal of devices accessible over different transports. The PnP manager controls creation of objects for transport instances and manages loading drivers supporting the transport instances.

Computer 302 may provide a graphical user interface 316 that enables a user of computer 302 to view and manage multi-transport physical device 304. Device 304 may be presented on user interface 316 using any suitable graphical and/or textual representation. For example, an icon such as icon 202 shown in FIGS. 2A and 2B for device 304 may be presented to the user. To provide such a representation, computer 302 may comprise a device display object 315 created using DUID 307 provided by transport components 306 and 308 of device 304. Device display object 315 allows presenting device 304 on user interface 316 independently of transports over which device 304 is accessible. The device display object allows managing device 304 and the associated transports. For example, the user may be able to view available transports and their characteristics and select a transport to access the device.

As discussed above, a device identifier such as a DUID may not be available for a multi-transport device. In such scenarios, a device display object may be created for each device instance. Thus, in the example shown in FIG. 3, a single representation of the device may not be available and two device display objects (not shown) may be created for each of the transport component 306 and 308. However, a function identifier (e.g., ID 305) may be used to merge the two device display objects to generate a single representation for the function of device. In these embodiments, a representation for the device such as icon 202 represents a function of the device. It should be appreciated, however, that when the DUID is not provided, it may be created using any suitable known method.

Various computer applications may communicate with a multi-transport device. Transports used to access a multi-transport device may have substantially different characteristics. To ensure efficient execution of applications, it is desired that the applications do not explicitly select transports to access the device but rather specify desired transport characteristics. For example, some applications may desire to send large amounts of data to a storage using a transport that can provide a faster connection such as a USB connection. As another example, a wired transport may be more suitable for synchronization of personal contact information (e.g., in an address book stored on a cell phone and a database stored on a personal computer). In some scenarios, an application may desire to establish a connection to a multi-transport device over more than one transport simultaneously such that data can be sent over any transport(s) available at the time.

FIG. 3 shows that computer 302 comprises applications 318, each of which can specify, via an interface 319, characteristics it desires of transport(s) used to access device 304. Thus, an application may not need to explicitly select a transport. To enable this functionality, one or more components implementing embodiments of the invention (e.g., a driver for composite device object 314) can manage dynamic addition and removal of transports and at each time point select the most suitable transport to provide continuous service to the application.

It should be appreciated that computer 302 shows components implementing some embodiments of the invention by way of example only and may comprise any other suitable components.

Figure 4:
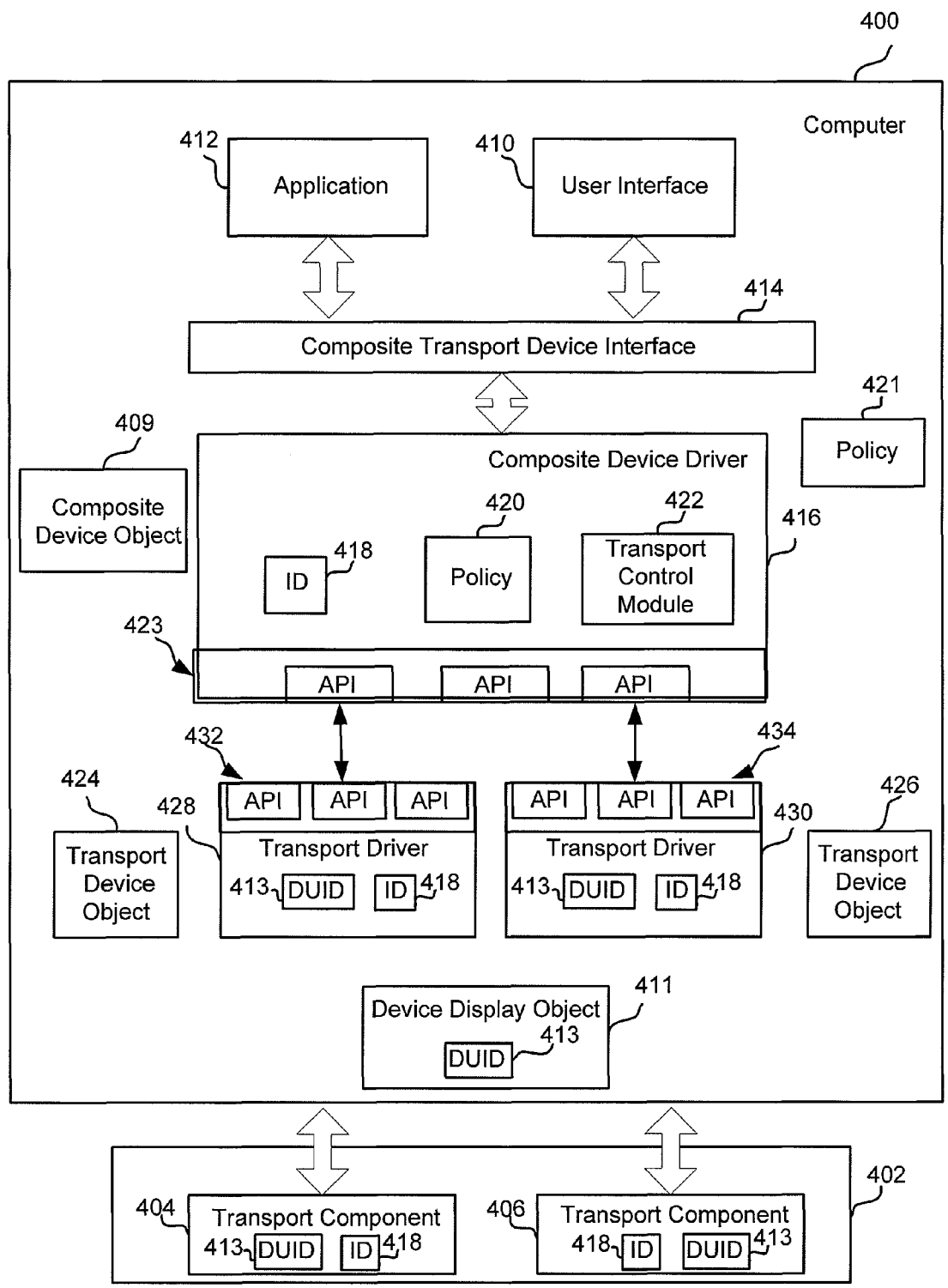
FIG. 4 is another block diagram of a system in which some embodiments of the invention may be implemented.

FIG. 4 shows in more detail components providing functionality of some embodiments of the invention. Computer 400 may access a multi-transport device 402 via at least one wired or wireless transport. Device 402 described in connection with FIG. 4 is shown as a single-function device for the sake of simplicity. However, it should be appreciated that, in some embodiments, device 402 may be a function of a multi-transport, multi-function device. Device 402 includes transport components 404 and 406 which are similar to transport components 306 and 308 in FIG. 3. It should be appreciated that two transport components are shown by way of example only and one or more of any suitable transport components may be included in device 402. The transport components comprise any suitable number of software, hardware and combination(s) thereof components supporting communications between device 402 and computer 400. Each transport component contains an identifier used to identify the respective instance of the device accessed over the transport. The identifier may be, for example, a function identifier ID 418 that is different for different functions of a multi-function device. Moreover, each transport component may provide a device unique identifier (DUID) 413. Such DUID 413 may be used to create a device display object 411, shown to include DUID 413, used to provide a representation of device 402 to a user. The identifiers can be provided, via respective interfaces of transport components 404 and 406 (not shown). The interfaces may also be used to communicate with computer 400 and may provide characteristics of the respective transports available to access the device. The characteristics may comprise a bandwidth, throughput, latency, security features, power consumption rate and any other suitable characteristics.

As discussed above, when a multi-transport device such as device 402 connects to computer 400, a composite device object 409 may be created for each function of the device and a suitable software component such as a composite device driver 416 loaded for composite device object 409 allows interacting with the multi-transport device. For example, a transport component (e.g., transport component 404 or 406) may report an identity of the associated transport to computer 400 by providing an identifier such as ID 418.

Each transport component may include any other suitable components. For each transport used to access device 402, a respective driver for a bus used to discover the transport may enumerate the transport by creating a respective transport device object. Device controller such as a PnP manager may control loading respective transport driver for each transport device object. Thus, FIG. 4 shows transport device objects 424 and 426 and transport drivers 428 and 430 loaded for transport device objects 424 and 426, respectively. The drivers for the transport device objects may each expose a respective application programming interface (API), as discussed below. The interfaces may be used to provide various identifiers such as, for example, function identifiers and device identifiers, and to interact with a driver for the composite device object associated with the transport device objects. It should be appreciated that the transport device objects and their respective drivers may be associated in any other suitable way.

When transport device objects 424 and 426 are created, transport driver(s) including an identifier shown as ID 418 are loaded for each of the objects 424 and 426. The device specifies the identity of each transport instance using ID 418. As discussed above, device 402 may represent a function of a multi-function device. In such scenario, different identifier is provided by each function supporting connections over one or more transports. It should be appreciated that transport drivers 428 and 430 and components that they include are shown by way of example only. Transport drivers 428 and 430 also provide DUID 413, if the device identifier is available. For the sake of simplicity, some components conventionally included within a computer or that one of skill in the art would understand are present or that are not involved in providing functionality as described herein may not be shown. The transport device objects for different transports may be different and independent of each other. This illustrates that in conventional systems, such as the one shown in FIG. 1, each transport instance of a multi-transport device appears as a separate device to components of a computer (e.g., an operating system) and to a user of the computer. As discussed above, some embodiments of the invention provide a method of creating an entity such as the composite device object that is "shared" by otherwise independent transport device objects.

Embodiments of the invention enable creating composite device object 409 for a multi-transport device having a single function or for each function of a multi-transport, multi-function device. Composite device object 409 provides an input/output (I/O) path to the device. Composite device object 409 links transport instances of the device together using device identifier ID 418 thus providing a single representation of functionalities of transports used to access device 402. Composite device object 409 may comprise any suitable components. FIG. 4 shows a composite device driver 416 supporting functionality of composite device object 409. It should be appreciated that more than driver may be associated with composite device object 409. Driver 416 may be provided, for example, by a manufacturer of device 402. The driver is loaded with ID 418 and may include transport control module 422 and policy 420. Drivers 416, 428 and 430 are used to interface transport instances of device 402 with suitable components (e.g., the operating system) of computer 400. Composite device driver 416 may receive I/O requests from applications and send the requests to appropriate transports.

As discussed above, in some embodiments, a device identifier uniquely identifying device 402 may not be available. In such scenarios, more than one device display object may be created each representing a device instance for a function over a transport. For example, if a cell phone can be accessed via both a USB connection and a Bluetooth link, two device display objects may be created, one representing the cell phone function over the USB connection and another representing the cell phone function over the Bluetooth link. ID 418, which is identical for both of the transports, may then be used to link the two device display objects together to provide a single representation for the cell phone function. If the cell phone is a function of a multi-function device (e.g., a "smart" phone), the above process may be used to provide a representation for each function of the multi-function device when the unique device identifier for the device is not available.

In the example illustrated, composite device driver 416 may comprise one or more different APIs shown by way of example as APIs 423. Similarly, the transport drivers may comprise various APIs shown as APIs 432 and 434, and may provide functionality using known techniques including receiving information or commands, providing information or commands, allowing other computers to register for notifications and providing notifications. It should be appreciated that APIs 423, 432 and 434 are shown by way of example only as embodiments of the invention are not limited to any particular type(s) of interfaces.

APIs, such as APIs 432 and 434, may provide an identifier such as ID 118, communicate characteristics of the associated transport, report changes in the characteristics and provide other suitable information from the transport device objects to the composite device driver. These APIs may be implemented to extend functionality of known APIs of transport device drivers. Each transport device driver may use one or more APIs for various communications with composite device driver 416. Each API may provide and/or receive particular type of information to/from the composite device driver. Alternatively, each API may be used for communicating different types of data. For example, a notification API may be used to notify the composite device driver of addition or removal of transports. Further, another API may be used to provide characteristics of the associated transport and dynamically update the information as the characteristics change.

Each transport device object newly created when a multi-transport device becomes available over an additional transport reports its presence and identity to the composite device driver which, in turn, determines that the transport device object is an instance of the device, using an identifier such as ID 418. One or more APIs 414 may be used to communicate with applications (e.g., application 412) and/or a user (e.g., via user interface 410). It should be appreciated that any suitable interfaces can be used as embodiments of the invention are not limited to any specific type(s) of interfaces.

As discussed above, composite device interface 414 may be used to obtain from the user and applications operating characteristics desired of transports used to access a multi-transport device, notify the user and applications of available transports and associated operating characteristics of the transport, and changes in the transports. The changes may include addition and removal of transports as well as changes in the operating characteristics of one or more transports currently used to access the device. It should be appreciated that composite device interface 414 may comprise one or more APIs of any suitable type as the present invention is not limited in this respect. For example, separate interfaces may be employed to communicate with the user and the applications. Thus, an interface such as interface 319 shown in FIG. 3 may be used to communicate with applications. Further, separate interfaces may be used to receive operating characteristics desired of a transport and to report operating characteristics of a transport currently used to access a multi-transport device.

As discussed above, creating composite device object 409 and loading driver 416 for the object allows seamlessly interacting with device 402. A computer system (e.g., its operating system), a user of the system and/or applications executed by the system may thus interact with the device. Computer 400 is shown to comprise user interface 410 and application 412. It should be appreciated that these components are shown by way of example only and embodiments of the invention are not limited to any particular number or type of applications that can communicate with device 402. Similarly, embodiments of the invention are not limited to any particular number or type of user interfaces that enable a user of computer 400 to manage access to device 402.

To access multi-transport device 402, a transport may be selected either by an operating system of computer 400 in accordance with some internal computer settings (e.g., using policy 421) or by a user or an application. The user (e.g., via user interface 410) and application 412 may explicitly select a suitable transport. Also, the user and application may specify functionality desired of a transport used to access device 402. The desired functionality may be specified, for example, via composite device interface 414. Composite device interface 414 may be defined by the operating system. The operating system of computer 400 provides communications between devices (e.g., transport, composite and any other suitable device) and applications and services executed by computer 400. The operating system may be the Microsoft® Windows® operating system, though other suitable operating systems may be substituted as the present invention is not limited in this respect. Hence, composite device interface 414 can receive transport requirements from a user or an application and provide the requirements to composite device driver 416. It should be appreciated that the requirements may be provided by a user or an application in any suitable format as embodiments of the invention are not limited in this respect.

In some embodiments, a user interface may be provided for the user to specify transport requirements at a high level. For example, the user may indicate a desired quality of a connection to the multi-transport device. Thus, some embodiments of the invention provide presenting current operating characteristics of available transports to a user at an abstract level rather than reporting the actual operating characteristics. Consequently, a user who may be unfamiliar with the specifics of transport characteristics may still be able to specify desired transport parameters. Also, when a multi-transport device becomes available over a new transport, the user need not be informed of operating characteristics of this transport. The system may evaluate the operating characteristics of the new transports and make decisions regarding device access.

Any suitable component within the system may evaluate the operating characteristics using the user specified criteria. In the embodiment illustrated, composite device driver 416 for composite device object 409 evaluates the specified operating characteristics to identify an appropriate transport for a user or an application. Regardless of which component performs the evaluation, if the characteristics render the new transport to be more suitable to access the device than a currently used transport, communications (e.g., I/O communication paths) may be switched from the currently used to the new transport. In some scenarios, an I/O path from an application may be routed to a different transport. Further, a specific I/O request may be routed to a different transport. Thus, different parts of the same I/O request may be sent over different transports. Moreover, in some embodiments, a single I/O request may be sent over multiple transports. Furthermore, an I/O request may be broken down into a number of smaller parts, and one or more of the parts may be sent over different transports. If an I/O request directed to a transport fails, the composite device driver or other suitable component may "fail over" to another transport for this request.

When operating characteristics of a currently used transport change so that the transport becomes less suitable to send certain data to and/or from the device, another transport may be selected whose operating characteristics are more suitable to access the multi-transport device. In some embodiments, transport selection may be made automatically by components within this system without notifying the users. The user may not need to be aware of the transport switching, though this information is available to the user.

Similarly, in some embodiments, an application may not need to explicitly specify desired transport requirements. A system (e.g., an operating system) may dynamically determine current transport requirements of the application and select the most suitable transport whose characteristics match the transport requirements.

When a user or an application specifies desired transport characteristics, composite device driver 416 or other suitable component(s) of the system may use the specified transport requirements to select an appropriate transport for the user or the application. Also, a user or an application may themselves select a transport. Further, if neither the user nor the application provides any transport requirements, the transport selection may be controlled by a system policy or other system attributes. Configuration settings of the system may also be used in evaluating transport characteristics to select a suitable transport. Thus, composite device driver 416 comprises policy 420 that may be used to select a transport. It should be appreciated that the policy may be any suitable component specifying transport preferences of the system. A transport selection process may be controlled by transport control module 422 that may carry out the controlling in any suitable way. For example, transport control module 422 may manage policy 420. Upon selecting the most appropriate transport either in accordance with requirements of a user or an application or based on a policy such as policy 420 or any other suitable system policy, composite device driver 416 communicates, via a suitable API, the result of the selection process to the corresponding transport device driver, thus allocating communications with the device to a particular transport. It should be appreciated that, in some scenarios, composite device driver 416 may not select the appropriate transport. Then, other suitable components such as, for example, device controller 320 which may be a PnP manager may select a transport.

Figure 5:
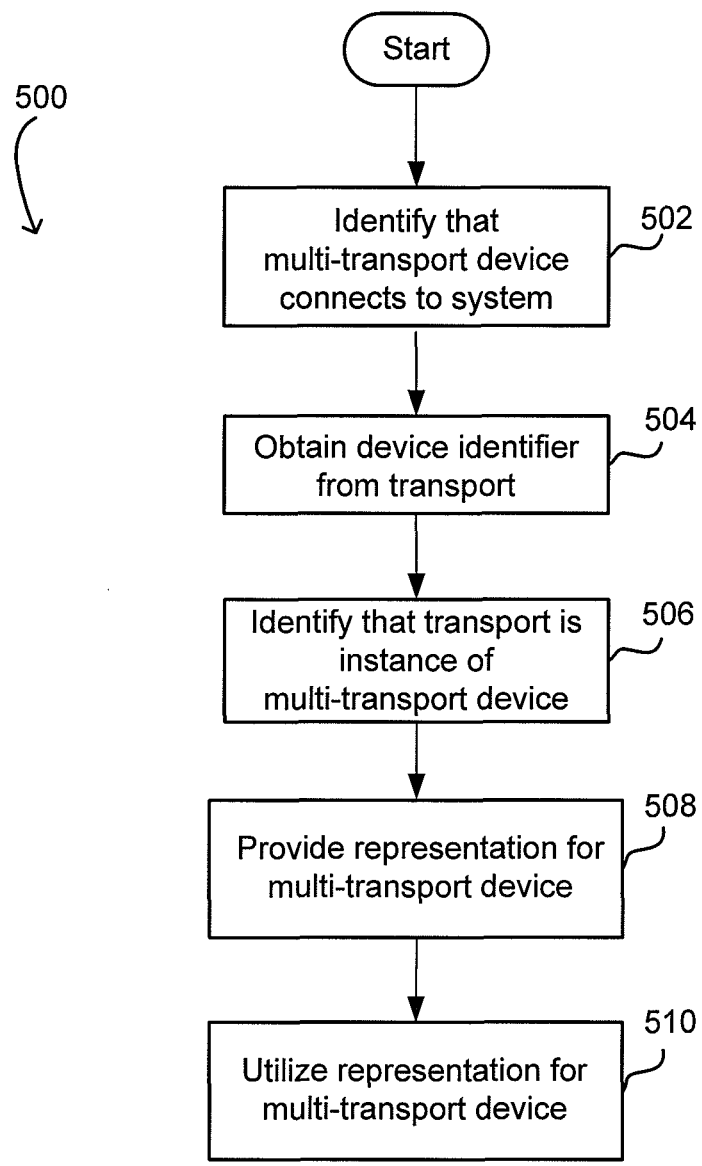
FIG. 5 is a flowchart of a method of identifying device instances of a multi-transport device based on device identifier according to some embodiments of the invention.

As discussed above, each transport instance of the transports used to access a multi-transport device may report a common identity of the transports. The common identity may be, for example, a device identifier. FIG. 5 shows a process 500 of obtaining device identifiers from transports of a multitransport device to identify the transport instances of the device and link them together. The process starts when the multi-transport device (e.g., device 304) connects to a system such as a personal computer via one or more wireless or wired connections. For example, a user may plug a cell phone into the computer via a USB port. At block 502, the process identifies that the device is connected to the computer using any known technologies such as, for example, the PnP architecture. The process may then go to block 504 where a device identifier (e.g., DUID 307 or DUID 413) is obtained from a transport over which the device becomes first available. The device identifier reports the identity of a transport instance of the device created when the device is accessed via the transport.

As discussed above, the device identifier allows determining that the transport instance is a transport used to access the multi-transport device. All transports that can be used to access the particular device report the common identity via the device identifier. Each multi-transport physical device can be uniquely identified because the device and its transport instances are presumed to be assigned the same device identifier that is different from the device identifier for any other device. FIG. 5 shows that, in block 506, it may be identified that the transport in an instance of the multi-transport device.

As discussed above, user experience may be improved by providing a representation for the multi-transport device independent of transports that may be used to access the device. The representation may be provided by creating a display device object for the device that allows managing the device and transports used to access it. The device display object is created when the device first becomes accessible via a transport. FIG. 5 shows that the representation for the device is provided in block 508. The representation allows displaying the device to a user who may manage the device using the representation.

In block 510 of FIG. 5, the user may utilize the created representation for the device. The representation allows presenting the multi-transport device to the user on a graphical user interface (e.g., as icon 202 shown in FIGS. 2A and 2B). Such representation improves the user experience by enabling the user to view the multi-transport device in an intuitive manner and manage the device as a whole. The user may view any available information on the device and the associated transports (e.g., upon clicking on the corresponding icon), select transports explicitly or provide transport requirements for the system to make a decision and perform other operations related to accessing the device. Thus, the device display object created for the multi-transport device is a logical representation for the device that links together transport instances of the device based on a common identity (e.g., the device identifier).

In block 510, additional transports used to access the device may become available. When the device becomes accessible over a new transport, a device instance for this transport may provide the device identifier (e.g., DUID) that is used to link this device instance with other instances of the device via the existing representation of the device created in block 508. For example, a cell phone accessible over a Bluetooth link may be plugged into a USB port.

If is it determined that there is an additional transport, the process may return to block 504 where the device identifier may be obtained from the new transport to thus determine that the same multi-transport device becomes available over an additional transport. When a transport is removed (e.g., a cell phone is unplugged from a USB port), the device display object may be maintained regardless the removal. As discussed above, the representation of the device created using the device identifier is independent of the available transport. When no transports are available to access the device, the device display object may be maintained for a certain time period (e.g., a time period determined by a system policy) and may then be removed.

FIG. 5 shows a process of creating a representation for the multi-transport device. The representation such as an icon may be presented to a used on an interface such as a graphical user interface. It should be appreciated that the process shown in FIG. 5 may be independent of a process of creating and maintaining a composite device object used to access a function of the device on one or more transports via a single representation. Thus, in some embodiments, when device identifiers may be provided by device instances, the device display object may be created even when no transport drivers are loaded for the device.

Figure 6:
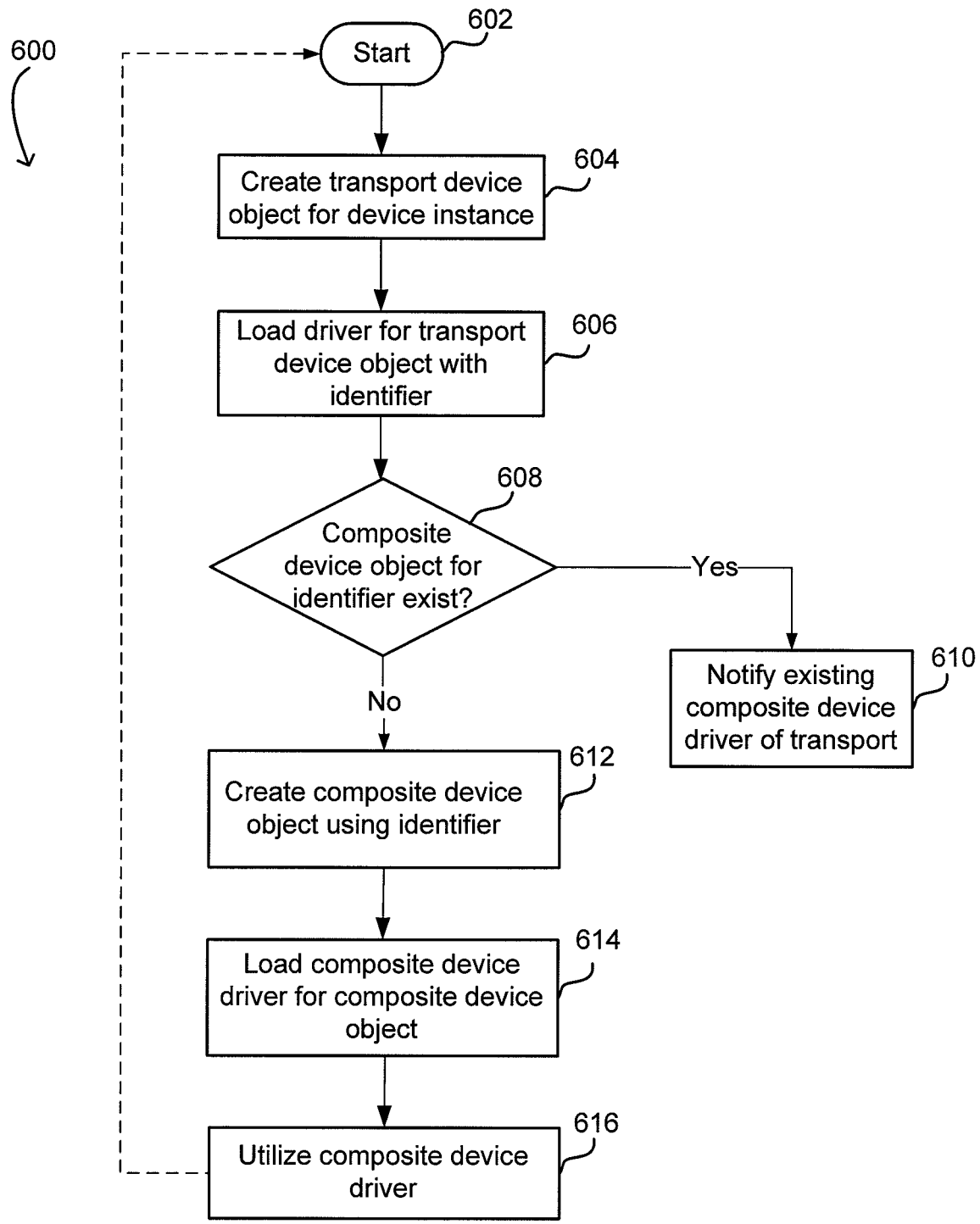
FIG. 6 is a flowchart of a method of creating a functional representation for a multi-transport device according to some embodiments of the invention.

Embodiments of the invention also provide a method of creating an entity that provides a functional interface used to access multiple transports used to access the device. Thus, FIG. 6 illustrates schematically a process 600 of creating and/or utilizing such an entity which may be a composite device object. FIG. 6 also shows loading drivers for the composite device object.

The process 600 may start at block 602 when a device becomes available over a transport perceived by the operating system as a respective device instance, which may occur at any suitable time. For example, the process may start when the multi-transport device (e.g., device 304) connects to a system such as a personal computer via one or more wireless or wired connections. For example, a user may plug a cell phone into the computer via a USB port. Also, the process 600 may start when a device that is already being accessed via one or more transports become accessible via a new transport. In block 602, the process identifies that the device is connected to the computer using any known technologies such as, for example, the PnP architecture. The multi-transport device may perform a single function. Also, the device may be a multi-function device in which case process 600 may be performed for each function of the device.

In block 604, a transport device object may be created for the device when the device is enumerated by a suitable component of the system such as a transport stack (e.g., a USB stack) in the PnP architecture. In embodiments of the invention employing the PnP technology, the transport device object is a node on a device tree maintained by the PnP manager to keep track of devices accessed by the system. A suitable bus or other entity on the computer discovers the device instance and a driver for the bus enumerates the device instance by creating the respective transport device object.

The process may then go to block 606 where a suitable component such as a PnP manager may load a driver (e.g., transport driver 428 or 430) for the transport device object. The system may determine that the loaded driver supports multiple-transport access to the device and therefore is loaded for a device instance. The driver may be loaded with an identifier (e.g., ID 305 or ID 418) which may be obtained from a transport over which the device becomes first available. The driver may obtain the identifier using any suitable method. The identifier reports the identity of the device instance on a transport when the device is accessed via the transport. The identifier may be different for each function, i.e., each device instance for the same function of the device reports the same identifier across different transports. It should be appreciated that embodiments of the invention are not limited to any specific identifiers and any suitable identifiers may be substituted.

In decision block 608, it may be determined whether a composite device object exists that is associated with this identifier. In other words, it may be determined whether the transport is a first transport for the identifier reported for the transport. If it is determined that the composite device object already exists for this identifier, a driver (e.g., composite device driver 416) for the existing composite device object may be notified of the new transport that is may be used to access the device, in block 610. The composite device driver composite device object may then obtain operating characteristic of the transport and may be used to manage access to the device via the transport. The composite device object may also be a node on the device tree. However, the composite device object may not be enumerated by any existing bus driver. The composite device object is a functional representation of the device performing a single function or of a function of a multi-function device and is independent of the transports for which it is enumerated.

If it is determined, in block 608, that a composite device object for the identifier does not exist, i.e., the transport is a first transport reporting the identifier, the process may branch to block 612. A suitable component such as a PnP manger may then create the composite device object may be created for the device (i.e., a function of the device) using the identifier, according to some embodiments of the invention. As discussed above, the composite device object may be created for a device even when the device is accessible via a single transport only. The composite device object is a functional representation of a device that is used for interacting with the device which includes, for example, managing communications with the device by selecting desired transports, adapting to changes such as addition and removal of transports and performing any other suitable functions.

In block 614, a driver (e.g., composite device driver 416) may be loaded for the composite device object. The composite device driver may then be utilized as a functional representation of the device, as shown in block 616. In some embodiments, transport drivers that share the composite device driver may be independent of each other. The composite device driver may be maintained in the system until no transports are available and the device may no longer be accessed. Further, in some embodiments, the composite device object may exist during a temporary absence of any transports and may be removed only some time interval after the device can no longer be accessed. Duration of the time interval may be predetermined by the system based on some system parameters.

The system (e.g., computer 302) recognizes transport instances of the device and interacts with the multi-transport device using the available transports. The system may interact with the multi-transport device using the composite device driver as a representation for the device. As discussed above, the composite device driver manages I/O requests to a device across the available transports. The process shown in FIG. 6 is dynamic and may be performed for each device instance on a new transport. At any time, the multi-transport device performing a single function or a function instance of the multi-transport, multi-function device may become accessible over a new transport and the identity of the new transport may be determined, for example, using the identifier. Thus, a dotted line in FIG. 6 shows that the process may return to start block 602 from block 616.

A transport used to access the multi-transport device may become unavailable so that a respective instance of a multi-function device may be removed from the computer system. For example, a cell phone available over a Bluetooth link and a USB connection may be unplugged from the USB port. Hence, the USB transport is removed. As discussed above, embodiments of the invention provide a method of creating and maintaining an entity such as a composite device object representing the multi-transport device such that the removal and addition of transports may be transparent to applications accessing the device.

As discussed above, in some scenarios (e.g., where one or more of the transports used to access the device is an unreliable or transient connection such as a Bluetooth link), the composite device object may not be removed immediately after the last transport used to access the multi-transport device is removed. In such examples, the composite device object may be removed after a time interval. Duration of the time interval may be predetermined and may depend on types of transports that were used to access the device. For example, if a Bluetooth-enabled device (e.g., a mobile phone) comes out of range, the composite device object may remain in the system for some time to ensure that the device does not come within the range after a time interval. The composite device object may include a removal policy controlling the duration of existence of the composite device object. To implement the policy, the composite device object may obtain such a characteristic of each transport as a quality of service (QoS).

The composite device object may be maintained in the system in the absence of transports in some other situations as well. Thus, when a communication between the system and the device is switched from one transport to another, the composite device object remains in the system but may be temporarily not associated with any transport.

As discussed above, a transport to access a multi-transport device may be selected from the available transports. The transport may be selected by a composite device driver, an application or an operating system based on respective preferences. The composite device driver may include one or more policies (e.g., policy component 420) used to perform the selection. The operating system may also utilize one or more policies (e.g., policy component 421). Further, the user and the application may explicitly specify a desired transport. Alternatively, the user and the application may specify their respective transport preferences that may then be used by the composite device object or by the system to select a suitable transport.

A driver for the composite device object or other suitable component such as a component enumerating the composite device object (e.g., a PnP manager) may be used to select a transport to access a device based on composite device driver preferences. The selection process may be performed even for a single I/O request. A transport may also be selected based on user, application, or system preferences. Thus, the system may "prune" a list of available transports using the preferences to select the most suitable transport. The system may use operating characteristics of the available transports to perform the selection.

Figure 7:
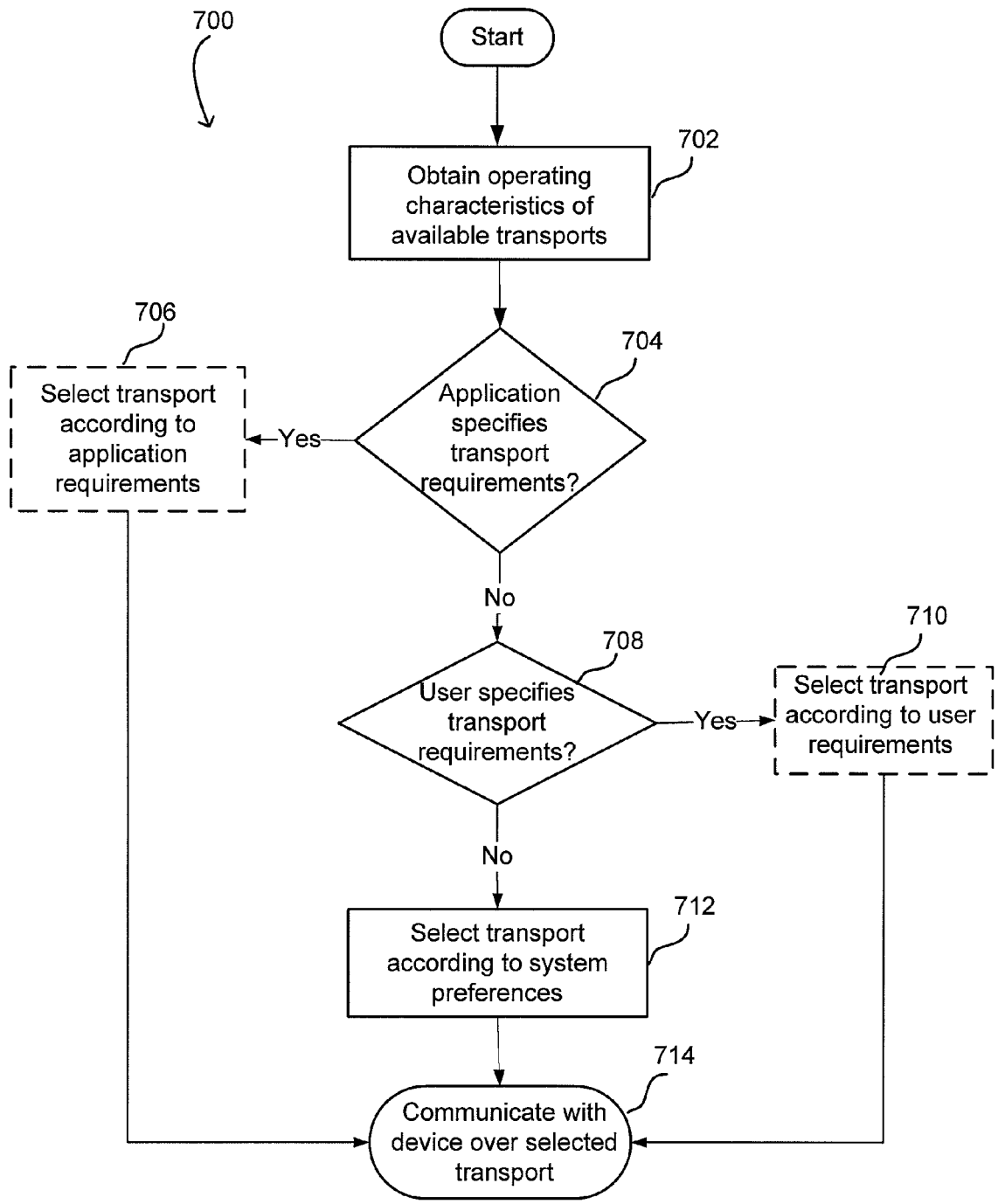
FIG. 7 is a flowchart of a method of selecting transports to access a multi-transport device according to an embodiment of the invention.

FIG. 7 shows a process 700 of selecting a suitable transport among transports available to access a multi-transport device based on operating characteristics of the transports. In block 702, operating characteristics of the available transports may be obtained. The operating characteristics may comprise a bandwidth, throughput, latency, security features, power consumption rate and any other suitable characteristics. As discussed above, in some embodiments, a transport device for each device instance of the multi-transport device provides the operating characteristics of the associated transport to the composite device driver for the composite device object representing the multi-transport device. The composite device driver is notified of changes in operating characteristics as well as of addition and removal of transports.

Applications may explicitly select transports based on the operating characteristics of the transports. However, as discussed above, it may be desirable that the applications are not involved in the selection of a specific transport. To provide continuous service to the application, the composite device driver may select an appropriate transport for an application to access the device. Thus, an application may specify its transport requirements, or preferences. In some embodiments, the composite device object may query the application for its transport requirements. It should be appreciated that each application may specify its transport preferences to access a multi-transport device. Thus, when two applications communicate with the same multi-transport device, each of the applications can specify its own transport preference for the device access. Also, when a single application executed by the computer communicates with the multi-transport device for multiple purposes (e.g., to send large amounts of data to the device and to synchronize certain information between the computer and the device), the application may specify requirements for a transport for be selected for each of the multiple purposes.

In decision block 704 of FIG. 7, it may be determined whether the application has provided the transport requirements. As discussed above, the composite device driver may query the application for the requirements. The application may provide the transport requirements in any suitable way. For example, composite device interface 414 may be used. If the answer is affirmative, the process may branch to block 706 where a transport may be selected by the composite device driver using the operating characteristics of the available transports. The composite device driver may evaluate capabilities of the available transports and select a transport whose operating characteristics match the best the requirements provided by the application. The selection process may be performed in any suitable way as embodiments of the invention are not limited in this respect. Abstracting the transport selection from the application advantageously allows dynamically managing addition and removal of transports as well as switching of transports (i.e., switching between transport drivers). After a suitable transport is selected, the process may go to block 714 where the application may communicate with the device over the selected transport. If more than one transport meets the application requirements, further transport selection may be performed based, for example, on user or composite device driver preferences.

It should be appreciated that it may be possible that no transport is available to match the application preferences, which is the reason that block 706 is shown using a dashed line. In this case, the composite device driver may select a transport based, for example, on its policy or on user preferences. Further, a system may employ one or more policies to determine further actions. Default settings may be used to select a transport if no transport matches the application requirements. For example, a "first seen" or "same as last" transports may be selected. It should be appreciated that embodiment of the invention are not limited in this respect and any suitable method may be used to select a transport.

If it is determined in decision block 704 that the application has not provided the transport requirements, the process may go to decision block 708 where it may be determined whether a user provided transport requirements. As discussed above, the system connected via one or more transports to the multi-transport device may comprise a graphical user interface (e.g., user interface 316 of computer 302 or user interface 107 shown in FIGS. 2A and 2B). It should be appreciated that any suitable user interface may be substituted as embodiments of the invention are not limited to any specific user interface. The user may be enabled to provide, either via the user interface or in any other suitable manner (e.g., via a programmatic or a command line), desired transport requirements. Embodiments of the invention may enable the user to provide the requirements in any suitable way. For example, in some embodiments, the user may specify operating characteristics desired of a transport. As another example, the user may employ a high level description of a desired transport. The user may also specify that the system favor low-power transports when a battery of the device is low. In other words, a user may specify that the system "save power" and the system may then use a transport selection as a mechanism to save the power.

If it is determined in decision block 708 that the user has provided the transport requirements, the process may go to block 710 where a transport may be selected by the composite device driver using the operating characteristics of the available transports. The composite device driver evaluates capabilities of the available transports and selects a transport whose operating characteristics match the user preferences. After a suitable transport is selected, the process may go to block 714 where one or more applications may communicate with the device over the selected transport. In some embodiments, a transport is selected in accordance with the user preferences for all of the applications executed by the computer that send data to and/or from the multi-transport device. In other embodiments, the user may specify desired transport requirements for a specific application.

It should be appreciated that it may be possible that no transport is available to match the user preferences, which is the reason that block 710 is shown using a dashed line. If this is the case, the composite device driver may select a transport based, for example, on its policy. Further, a system may employ one or more policies to select a transport.

It should be appreciated that a user, similarly to an application, may explicitly select a transport for device access. However, in the example illustrated in FIG. 7, the composite device driver makes decisions regarding a transport selection on behalf of the user or the application in accordance with either user or application requirements.

If it is determined in decision block 708 that the user has not provided the transport requirements, which indicates that neither the user nor the application has transport preferences, the process may go to block 712 where a transport may be selected in accordance with system preferences. The system preferences may be defined in any suitable way. For example, a system-wide policy may be used, which may be implemented in any suitable component specifying transport preferences of the system. The policy may specify preferred and undesirable transport characteristics. Also, the composite device driver may comprise a policy (e.g., policy 420) that may be used to select a transport when transport preferences are not specified. After a suitable transport is selected, the process may go to block 714 where one or more applications may communicate with the device over the selected transport.

The transport selection according to some embodiments of the invention is shown in FIG. 7 by way of example only. It should be appreciated that embodiments of the invention are not limited to any particular order in which it is determined whether an application, a user, a composite device driver or a system (e.g., an operating system) have specified desired transport requirements for access to the multi-transport device. Moreover, the processes discussed above in connection with FIG. 7 may be performed simultaneously. Thus, the user, application, composite device driver, or system preferences may be used to "prune" the available transports to select a most appropriate transport for device access.

Figure 8:
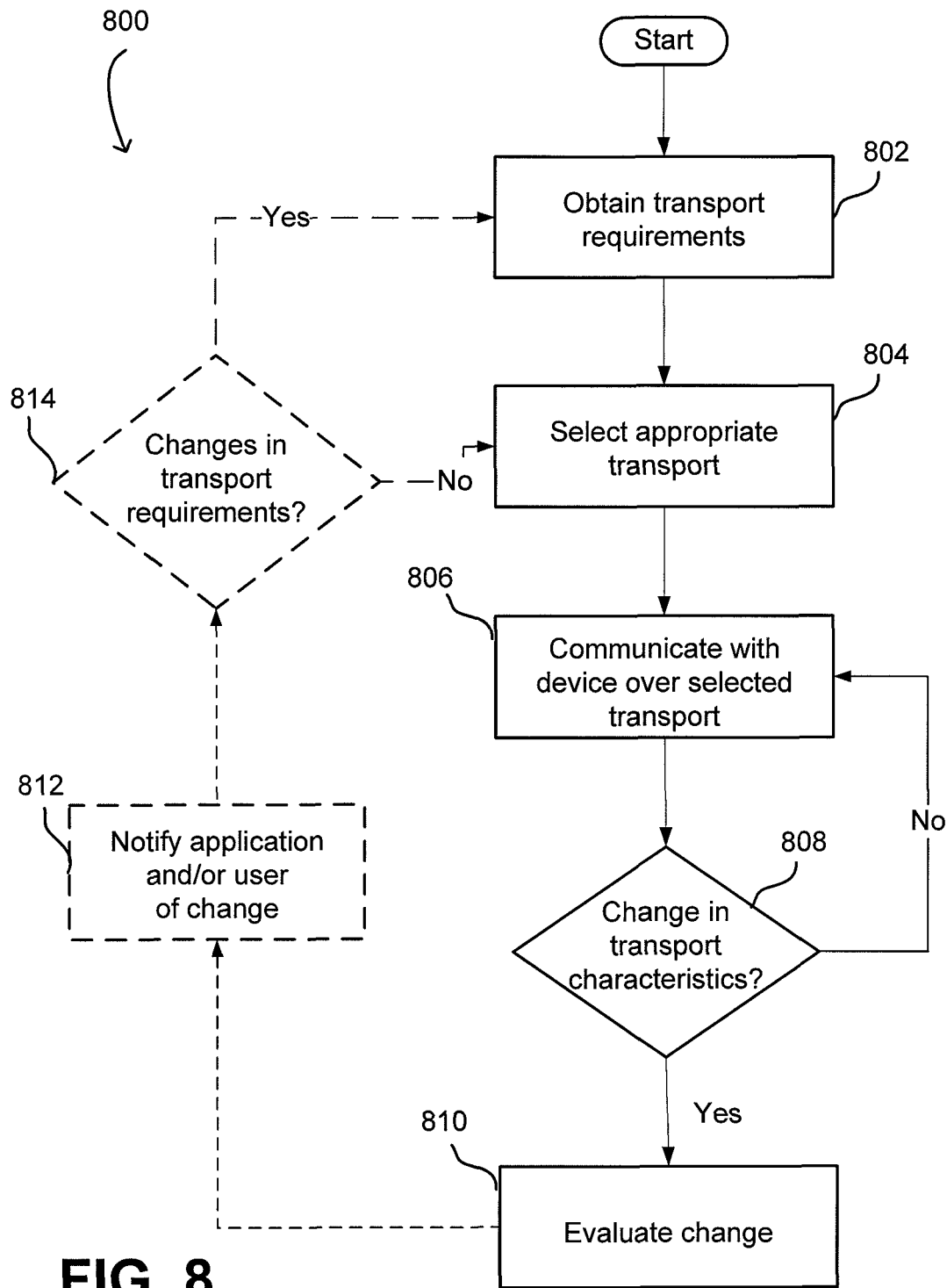
FIG. 8 is a flowchart of a method of evaluating changes in characteristics of transports used to access a multi-transport device according to an embodiment of the invention.

Typically, operating characteristics of transports change with time. Also, transports used to access a multi-transport device may be removed. New transports may be added. A composite device driver created to interact with the multi-transport device may thus be notified, via transport device driver or in other suitable way, of changes in the available transports, whether there is an addition or removal of a transport or changes in the characteristics of available transports. FIG. 7 shows schematically the process of transport selection based on user, application or system-specified transport requirements. FIG. 8 further illustrates a process 800 of responding to changes in transport conditions according to some embodiments of the invention.

The process may start at any suitable time after a multi-transport device is accessed by a system (e.g., by any suitable computer). In block 802, transport requirements may be obtained from a user, an application or a composite device driver, as discussed above in connection with FIG. 7. The process may continue to block 804 where a transport may be selected using the operating characteristics of the available transports. As discussed above, a transport may be selected for a single I/O request. The transport may be selected by the composite device driver. Further, if for some reasons the composite device driver does not perform the selection, the system may select a transport based on the system policy which may be specified in any suitable way. For example, a user may set the policy. The composite device driver evaluates capabilities of the available transports and selects a transport whose operating characteristics match the best the requirements provided by the application. The selection process may be performed in any suitable way as embodiments of the invention are not limited in this respect. Abstracting the transport selection from the application advantageously allows dynamically managing addition and removal of transports as well as switching of transports. After a suitable transport is selected, the process may go to block 806 where the application may communicate with the device over the selected transport.

Transport characteristics may change with time. Some characteristics may change while a transport is in use by a computer system. FIG. 8 shows that the process 800 may continue to decision block 808 where it may be determined whether there is any change in operating characteristics of the available transports. It should be appreciated that the change may be attributed to any suitable difference between a currently measured value of a transport parameter and a previously measured value of the parameter. For example, a throughput of a transport may change with time. In addition, the change in transport characteristics may include addition of a new transport and removal of a transport. More than one transport can be added or removed. In either scenario, the operating characteristics of available transports may be evaluated upon the change, in block 810. The operating characteristics of a transport currently used by the application to communicate with the device may no longer be best suited for the communications.

For example, a new transport may be more appropriate for the communication. Moreover, if a transport is removed, characteristics of the remaining transports, if any, may be evaluated to determine which of the transports is currently most suitable to access the device. FIG. 8 demonstrates that some embodiments of the invention implement a transport switching mechanism in response to the changes. However, it should be appreciated that, in some embodiments, a change in one or more of the transport characteristics does not necessarily result in switching to another transport. In some situations, a currently used transport may remain to be the most suitable. Furthermore, the transport parameters may change such that none of the available transports may meet the transport requirements. In such scenarios, the composite device object may make appropriate decisions regarding the device access.

As discussed above, the composite device driver may be notified of the changes in the operating characteristics of available transports. The composite device driver is also notified of the transport removal and addition. When the device becomes accessible over a new transport, operating characteristics of this may be provided from a transport driver loaded for a device instance on this transport to the composite device driver. Thus, embodiments of the invention provide a flexible mechanism adaptable to new transport technologies. Indeed, a new transport that may utilize a new technology may only need to provide its operating characteristics.

Optionally, in block 812, the application or the user may be notified of the change using any suitable mechanism such as an API (e.g., driver interface 414). As discussed above, a composite device driver created to interact with the multi-transport device and the associated transports as a single functional entity, is notified by transport device drivers for each of the transports of the changes in the characteristics of the corresponding transports. The composite device driver may notify the application or the user of the changes, for example, via the composite device interface 414. It should be appreciated that, in some embodiments, the composite device driver may determine that the operating characteristics of the available transports have not changed significantly enough to warrant informing the application. In other embodiments, any changes in the operating characteristics are reported to the application.

Optionally, in decision block 814, it may be determined whether the application or the user desires to input different transport requirements. It should be appreciated that changes in the transport requirements may be independent of changes in the current operating characteristics of the available transports. Therefore, block 814 is shown in a dashed line to indicate that it is optional. Composite device driver may query the application or the user for their respective transport requirements at any suitable time, including when no changed in the operating characteristics of the available transports have been detected. Also, the application may provide the requirements at any suitable time. If it is determined in block 814 that the application desires to change its transport requirements, the process may return to block 802 where the requirements may be obtained from the application and/or the user in any suitable manner. The process then continues as shown in FIG. 8. Alternatively, if no new transport requirements are provided, the process may follow to block 804 where an appropriate transport may be selected by the composite device driver or system using any suitable method, including the methods described above in connection with FIG. 7. The transport may be a previously used transport. Also, a suitable policy may be used to select a transport, as described above.

In the example illustrated, an application and/or a user may be notified of the changes in the operating characteristics of transports. However, it should be appreciated that embodiments of the invention are not limited with respected to any particular time of notification of the user and the application of the changes. Furthermore, the changes in the operating characteristics may be evaluated by the composite device driver or the system without notifying the user or the application of the changes.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a PDA, a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-readable storage medium encoded with computer-executable instructions, wherein the computer-readable storage medium does not consist of a transitory signal, for performing a method in a computer system comprising a computer and a device represented by a plurality of device instances and operable to communicate with the computer via a plurality of transports, each device instance being associated with a transport of the plurality of transports, the computer-executable instructions, when executed, performing a method comprising:

obtaining an identifier from at least one device instance from the plurality of device instances;

identifying, based on a value of the identifier, that the device instance is an instance of a multi-transport device communicating with the computer via the plurality of transports;

associating, using the identifier, the plurality of device instances with each other via an entity that is independent of the plurality of transports; and interacting with the multi-transport device using the entity.

2. The computer-readable storage medium of claim 1, wherein:
obtaining the identifier comprises obtaining the identifier from a driver associated with the at least one device instance.

3. The computer-readable storage medium of claim 1, wherein:
the entity comprises a driver associated with a composite device object.

4. The computer-readable storage medium of claim 3, wherein:
the composite device object is maintained independently of addition and/or removal of a transport from the plurality of transports.

5. The computer-readable storage medium of claim 1, wherein:
the entity is created when the identifier from the at least one device instance from the plurality of device instances is first obtained.

6. The computer-readable storage medium of claim 5, wherein:
when another device instance from the plurality of device instances provides the same identifier, the entity is notified of the another device instance.

7. In a computer system comprising a computer and a device operable to communicate with the computer via a plurality of transports, a method comprising:
obtaining an identifier for the device from at least one transport from the plurality of transports;

identifying, based at least in part on the identifier, that the device is a multi-transport device communicating with the computer via the plurality of transports, wherein the identifier is a common identifier received from each of the plurality of transports;

configuring a composite device driver based on the plurality of transports; and interacting with the multi-transport device using the composite device driver.

8. The method of claim 7, wherein:
interacting with the multi-transport device comprises selecting, by the composite device driver, a transport from the plurality of transports at an application level and/or a system level.

9. The method of claim 7, further comprising:
obtaining operating characteristics of the plurality of transports.

10. The method of claim 9, further comprising:
obtaining at least one transport requirement for at least one application in communication with the multi-transport device; and selecting, using the operating characteristics and based at least in part on the at least one transport requirement, at least one transport for use by the at least one application.

11. The method of claim 10, further comprising:
selecting at least one other transport for the at least one application to communicate with the multi-transport device.

12. The method of claim 7, wherein:
interacting with the multi-transport device comprises interacting through a plurality of transport drivers.

13. A computing system configured to communicate with a multi-transport device, said computer system comprising:
a processor;
a plurality of communication transports, each said communication transport configured to communicate with at least one multi-transport device;
a computer-readable memory, said memory communicatively coupled to the processor, the memory storing computer-readable instructions that when executed by the processor cause the computing system to:
obtain an identifier for a first device from at least one communication transport from the plurality of communication transports;
identify, based at least in part on the identifier, that the first device is a multi-transport device communicating with the computing system via the plurality of communication transports, wherein the identifier is a common identifier received from each of the plurality of communication transports;
configure a composite device driver based on the plurality of communication transports; and
interact with the first device using the composite device driver.

14. The computing system of claim 13, wherein the memory further stores instructions executable by the processor to:
select, by the composite device driver, a communication transport from the plurality of communication transports at an application level and/or a system level.

15. The computing system of claim 13, wherein the memory further stores instructions executable by the processor to:
obtain operating characteristics of the plurality of communication transports.

16. The computing system of claim 15, wherein the memory further stores instructions executable by the processor to:
obtain at least one communication transport requirement for at least one application in communication with the first device; and
select, using the operating characteristics and based at least in part on the at least one communication transport requirement, at least one communication transport for use by the at least one application.

17. The computing system of claim 16, wherein the memory further stores instructions executable by the processor to:
select at least one other communication transport for the at least one application to communicate with the first device.

18. The computing system of claim 13, wherein the memory further stores instructions executable by the processor to:
interact with the first device through a plurality of communication transport drivers.

* * * * *